United States Patent [19]

Barry

[11] Patent Number: 4,639,591
[45] Date of Patent: Jan. 27, 1987

[54] SYSTEM FOR OPTICAL MONITORING OF MACHINE POSITIONS

[75] Inventor: Robert F. Barry, Monroeville Boro, Pa.

[73] Assignee: Westinghouse Electric Corp., Pittsburgh, Pa.

[21] Appl. No.: 688,117

[22] Filed: Dec. 31, 1984

[51] Int. Cl.$^4$ .............................................. G01V 9/04
[52] U.S. Cl. ..................................... 250/221; 901/49
[58] Field of Search ............... 250/221, 222.1, 223 R, 250/209; 340/681, 555, 556, 557; 901/47, 49

[56] References Cited

U.S. PATENT DOCUMENTS

| | | | |
|---|---|---|---|
| 2,037,671 | 4/1936 | Yannes | 273/54 |
| 3,596,103 | 7/1971 | Matthews | 250/221 |
| 3,912,924 | 10/1975 | Barrett, Jr. | 250/209 |
| 4,030,088 | 6/1977 | McCullough | 340/267 |
| 4,104,518 | 8/1978 | Schachinger et al. | 250/221 |
| 4,166,543 | 9/1979 | Dahlstrom | 901/49 |
| 4,196,425 | 4/1980 | Williams, Jr. et al. | 340/556 |
| 4,408,195 | 10/1983 | Tullis et al. | 340/685 |

Primary Examiner—David C. Nelms
Attorney, Agent, or Firm—Daniel C. Abeles

[57] ABSTRACT

An installation composed of a plurality of machines disposed adjacent a common work space delimited by a boundary surface, each machine being associated with a respective portion of the boundary surface and having a work-performing member movable into and out of the work space through the associated boundary surface portion, and an optical monitoring system composed of a plurality of optical monitoring assemblies each associated with a respective machine. Each assembly includes: a light barrier structure including a plurality of light sensors each disposed in a light beam path to form a light barrier coextensive with the boundary surface portion associated with the associated machine, and each light sensor producing an electrical signal indicative of reception of light; an electrical signal processing device connected to receive the electrical signals from all light sensors for producing an intrusion signal when any one of the light sensors is not receiving light; a warning device connected to the electrical signal processing device for emitting a light signal in response to production of an intrusion signal; a light receiving device optically linked with the warning device of every other assembly for producing a warning signal in response to emission of the signal by the warning device of any other assembly; and a control device connected between the light receiving device and the associated machine for causing the work-performing member of the associated machine to remain outside the work space when a warning signal is being produced by the light receiving device.

7 Claims, 2 Drawing Figures

SYSTEM FOR OPTICAL MONITORING OF MACHINE POSITIONS

BACKGROUND OF THE INVENTION

The present invention relates to a system for monitoring the positions of a plurality of machines which are to perform work in a common work space.

In automated manufacturing operations, it often occurs that several different machines are assigned to perform successive manufacturing operations within a common work space. While such machines are normally controlled so as not to interfere with one another, the automatic control of such machines is relatively complex and errors which result in the work-performing member of more than one machine being in the work space at the same time can occur.

Moreover, there are manufacturing operations in which people work in conjunction with the machines, in which case there is a significant risk of injury to an individual due to being struck by such a work-performing member within the work space.

While various monitoring systems have been proposed, these are rather complex and do not permit direct observaion of their operating state.

SUMMARY OF THE INVENTION

It is an object of the present invention to monitor the presence of the work-performing members of manufacturing machines and individuals in a given work space in a manner which minimizes the risk of collisions within that space and which permits direct observation, by operating personnel, of the monitoring operation.

Another object of the invention is to provide a monitoring system in which the presence of an object in the work space is signaled to all other machines by means of visible light radiation.

A further object of the invention is to provide a system which does not require direct electrical, or radio wave, communication between the various machines.

The above and other objects are achieved, according to the invention, by the provision, in an installation including a plurality of machines disposed adjacent a common work space delimited by a boundary surface, each machine being associated with a respective portion of the boundary surface and having a work-performing member selectively movable into and out of the work space through the associated boundary surface portion to perform an operation in the work space, of an optical monitoring system composed of a plurality of optical monitoring assemblies each associated with a respective machine. Each assembly is composed of:

light barrier means including means producing a plurality of light beams and an associated plurality of light sensors each disposed in the path of a respective light beam, the light barrier means forming a light barrier coextensive with the boundary surface portion associated with the associated machine, and each light sensor producing an electrical signal indicative of reception of its associated light beam;

electrical signal processing means connected to all of the light sensors to receive the electrical signals therefrom for producing a light barrier intrusion signal when any one of the light sensors is not receiving its associated light beam;

optical warning means connected to the electrical signal processing means for emitting a predetermined light signal in response to production of a light barrier intrusion signal;

light receiving means optically linked with the optical warning means of every other assembly for producing a warning signal in response to emission of the predetermined signal by the optical warning means of any other assembly; and control means connected between the light receiving means and the associated machine for causing the work-performing member of the associated machine to remain outside the work space when a warning signal is being produced by the light receiving means.

DESCRIPTION OF THE PREFERRED EMBODIMENTS

Figure 1:
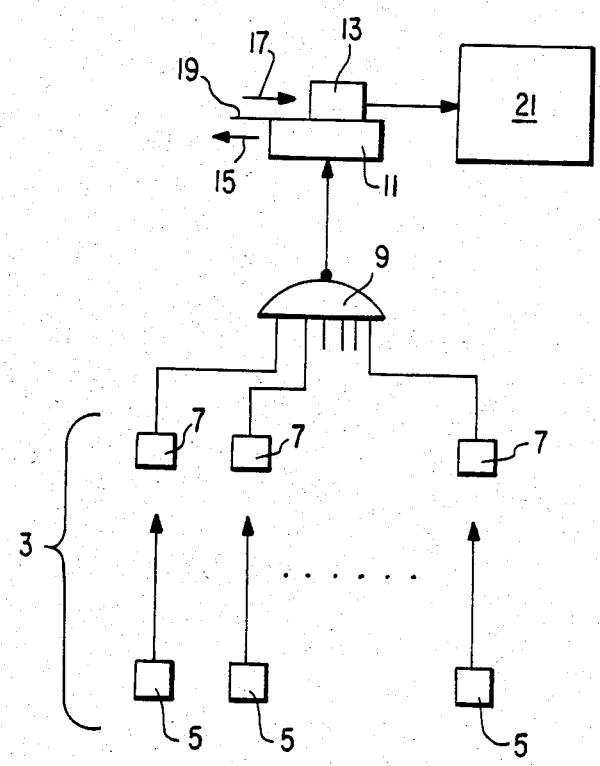
FIG. 1 is a block circuit diagram of a preferred embodiment of a monitoring assembly according to the invention.

FIG. 1 illustrates the essential components of one optical monitoring assembly of an optical monitoring system according to the invention. The illustrated assembly is composed of a light barrier unit 3 including a plurality of light beam sources 5 and an associated plurality of light sensors 7. Each light sensor 7 is disposed in the light beam path of a respective one of the sources 5 so that each sensor 7 is responsive only to the light from its associated source 5 and each source 5 forms with its associated sensor 7 an individual linear light barrier. The plurality of light beam sources 5 and light sensors 7 are arranged to form a planar light barrier composed of individual linear light barriers whose mutual transverse spacings are selected on the basis of the dimensions of the machine member whose movements into and out of a common work space are to be monitored. Preferably, the spacing between adjacent individual light barriers, at the level of the machine member, is made less than the smallest dimension of the member parallel to the plane of the planar light barrier.

Each of the light sensors 7 produces an output signal in response to reception of light from its associated source 5 and the electrical outputs of all sensors 7 are connected to respective inputs of an electrical signal processing circuit 9 which is here constituted by an AND gate having a plurality of inputs each connected to the electrical output of a respective sensor 7. Gate 9 has a negated output which is connected to the signal input of an optical warning device 11.

While light barrier unit 3 can be composed of any necessary number of individual light barriers 5, 7, only three such individual light barriers are shown for the sake of simplicity.

As long as all of the individual linear light barriers are unbroken, the negated output of gate 9 will produce a logic 0 output signal, while if any one of the light barriers is broken, the associated light sensor 7 will cease to produce an output signal, whereupon the output signal from gate 9 will assume the logic 1 state.

Optical warning device 11 is constructed to emit light in a first pattern when the signal from gate 9 has the logic 0 state and in a second pattern when the signal from gate 9 has the 1 logic state. By way of example, optical warning device 11 can be constructed to produce a steady light output in response to the logic 0 signal and a light signal having a predetermined on-off pattern in response to the logic 1 signal.

Associated with optical warning device 11 is a light receiving device 13 which is disposed in such a manner that light radiated in the direction 15 from optical warning device 11 does not enter the field of view of the associated light receiving device 13. In other words, light receiving device 13 is insensitive to light produced by the associated optical warning device 11. To assure this isolation, a shield 19 can be provided above the light emitting region of optical warning device 11.

Light receiving device 13, however, is positioned and constructed to be responsive to light emitted by the optical warning devices 11 of all other optical monitoring assemblies of the system.

Light receiving device 13 is provided with an electrical output lead connected to a control unit 21 of the associated machine. If light receiving device 13 receives a light signal having the predetermined light pattern, i.e., a predetermined light signal, from the optical warning device 11 of any other assembly, it emits a signal to control unit 21. Unit 21 is constructed to respond to such a signal in a manner to maintain or bring the work-performing member of the associated machine outside of the common work space.

As will be apparent from the preceding description, such signal will be produced when one or more linear light barriers of any other optical monitoring assembly are broken, either by the work-performing member of the other assembly or by some other object, such as an operator's arm.

Figure 2:
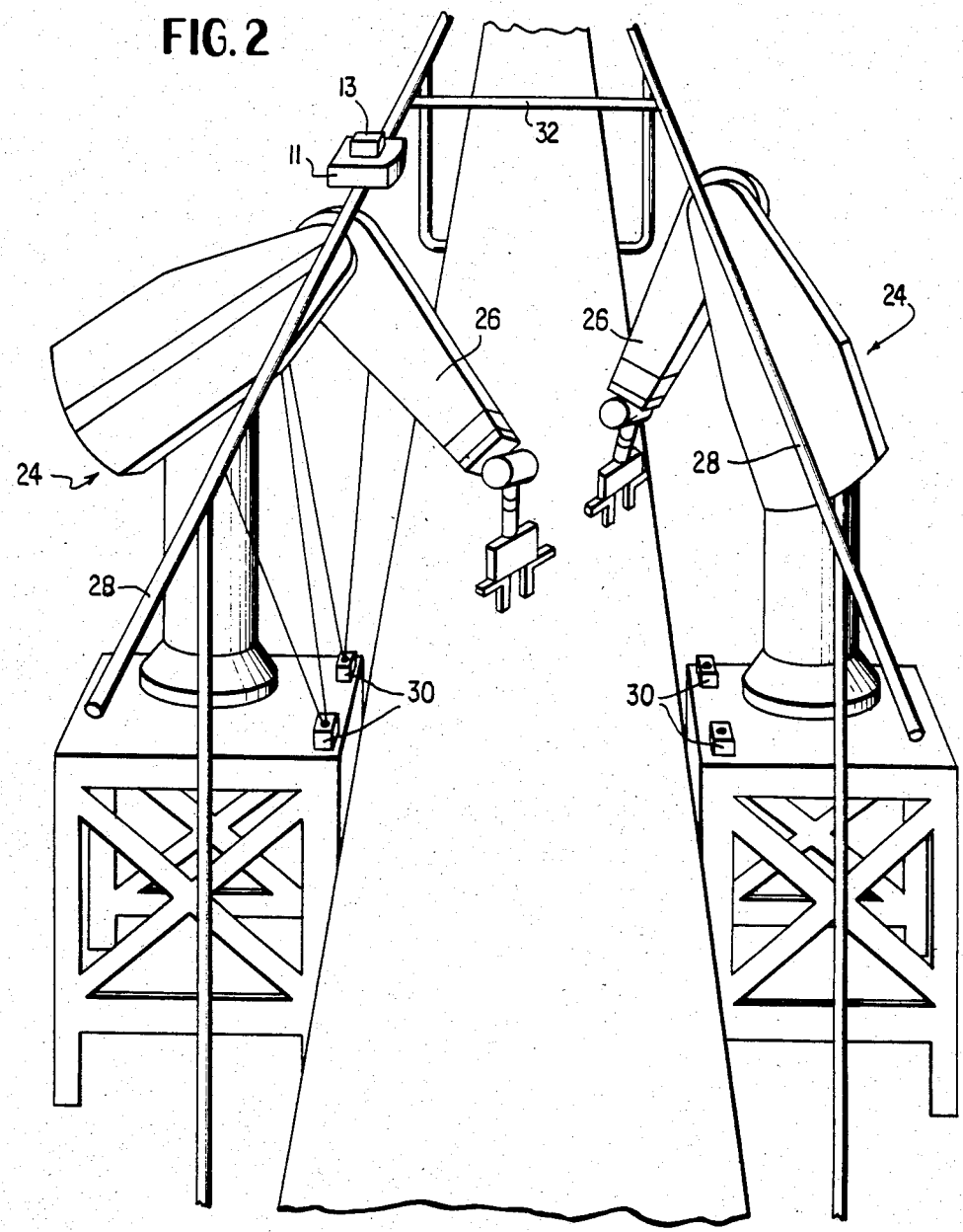
FIG. 2 is a perspective view of a manufacturing installation equipped with a monitoring system according to the invention.

FIG. 2 illustrates a work station equipped with two robotic machines 24 mounted to perform respective manufacturing operations in a common work space located between the machine stands. Each machine 24 includes an arm 26 which is movable into and out of the work space, a manufacturing operation being performed by each arm when it is in the work space, and it being intended that, particularly for safety reasons, only one arm 26 be located in the work space at any given time.

Lateral boundaries of the work space are delimited by overhead bars 28 each carrying a row of light sensors (not shown) which form a light barrier unit with two light beam sources 30 producing relatively wide beams. Each light sensor is in the field of one of those beams and thus forms with the associated source 30 a respective linear light barrier.

In this embodiment, the optical warning device 11 and light receiving device 13 associated with the left-hand machine is mounted atop the left-hand overhead bar 28, directly above the assciated machine. An identical optical warning device and light receiving device assembly for right-hand machine 24 would be identically mounted atop the right-hand bar 28. If the work space were further associated with a machine mounted overhead, the optical warning device and light receiving device of the optical monitoring assembly associated with the overhead machine could be mounted on a cross bar 32 extending between bars 28. Similarly, if machines are disposed along one or both of the other two lateral boundaries of the work space, the optical warning device and light receiving device of their associated optical monitoring assemblies could be mounted on cross bars similar to bar 32.

Each optical warning device 11 is oriented so that light which it emits is received by the light receiving device 13 of every other assembly, but not by its own associated light receiving device. If the arm 26 of any one machine is within the work space, at least one of the linear light barriers associated therewith will be interrupted, so that the associated optical warning device 11 will produce a signal indicating that the work space is occupied. This signal will be received by the receiving devices 11 of all other assemblies, resulting in the production of a signal which will be processed to maintain the arms 26, or other work-performing members, of the associated machines out of the work space.

The use of light signals to control the entry of work-performing members into the work space offers the advantage of direct visual observation of the status of the various machines by operating personnel. This is in contrast to radio wave signaling devices whose signals cannot be directly visually observed, and which may, moreover, be subject to interference from other electronic systems in proximity to the work space. The system according to the invention also offers the advantage that individual assemblies need not be wired together, so that installation of the individual assemblies is facilitated. The use of visual light signals also permits direct observation of the operating state of each system, i.e., it can be directly determined whether the signal being produced by a given assembly corresponds to the position of its associated work-performing member.

When an installation equipped with a monitoring system according to the present invention is placed in operation, all of the machine arms 26 are initially outside of the work space, so that all light barriers are unbroken. As soon as the arm 26 of one machine 24 enters the work space, one of its associated linear light barriers will be broken, so that the associated optical warning device 11 will begin emitting a predetermined light signal, which may be a sequence of discrete light pulses. This predetermined light signal will be received by the light receiving device 13 of each other assembly, resulting in the production of an electrical signal which is supplied to the associated control unit 21 to cause the associated machine to maintain its arm 26 out of the work space. After the arm which initially entered the work space is withdrawn therefrom, any other machine is free to move its arm into the work space under control of the operating program for the installation.

If, during the time when the arm 26 of one machine 24 is within the work space, a foreign body, such as the arm of an operator, should pass into the work space via a boundary surface portion associated with one of the other machines, the optical monitoring system of that machine will produce the predetermined light signal. This signal will be received by the optical monitoring system associated with the machine whose arm is presently within the work space, whereupon that arm will be withdrawn until the foreign object has been removed from the work space.

It will be understood that the above description of the present invention is susceptible to various modifications, changes and adaptations, and the same are intended to be comprehended within the meaning and range of equivalents of the appended claims.

I claim:

1. In an installation including a plurality of machines disposed adjacent a common work space delimited by a boundary surface, each machine being associated with a respective portion of the boundary surface and having a work-performing member selectively movable into and out of the work space through the associated boundary surface portion to perform an operation in the work space, the improvement comprising an optical monitoring system composed of a plurality of optical monitoring assemblies each associated with a respective machine, each said assembly comprising:

light barrier means including means producing a plurality of light beams and an associated plurality of light sensors each disposed in the path of a respective light beam, said light barrier means forming a light barrier coextensive with the boundary surface portion associated with the associated machine, and each said light sensor producing an electrical signal indicative of reception of its associated light beam;

electrical signal processing means connected to all of said light sensors to receive the electrical signals therefrom for producing a light barrier intrusion signal when any one of said light sensors is not receiving its associated light beam;

optical warning means connected to said electrical signal processing means for emitting a predetermined light signal in response to production of a light barrier intrusion signal;

light receiving means optically linked with said optical warning means of every other assembly for producing a warning signal in response to emission of the predetermined signal by said optical warning means of any other assembly; and control means connected between said light receiving means and the associated machine for causing the work-performing member of the associated machine to remain outside the work space when a warning signal is being produced by said light receiving means.

2. An installation as defined in claim 1, wherein each machine is a robotic manufacturing machine and the work-performing member of at least one machine is an arm carrying a work-performing device.

3. An installation as defined in claim 1, wherein, in each said assembly, said means producing a plurality of light beams comprises at least one light source, and at least two of said light sensors are disposed to receive light from said source.

4. An installation as defined in claim 1, wherein said means producing a plurality of light beams comprises a plurality of light sources, fewer in number than said plurality of light sensors, and each of said light sources emits light to a respective group of said light sensors.

5. An installation as defined in claim 1, wherein, in each said assembly, said optical warning means are operative for emitting, as the predetermined light signal, an on-off light pattern, and for emitting a steady light beam in the absence of a light barrier intrusion signal.

6. An installation as defined in claim 1, wherein, in each said assembly, said light receiving means are mounted to be optically isolated from the light signal emitted by said optical warning means.

7. An installation as defined in claim 1 further comprising a plurality of overhead bars each disposed above a respective machine in the plane of the respective boundary surface portion associated with its respective machine, and wherein said light sensors of said optical monitoring assembly associated with the respective machine are mounted on said overhead bar associated with said respective machine.

* * * * *